P. J. MAGUIRE.
EGG POACHER.
APPLICATION FILED APR. 30, 1915.
1,170,922.
Patented Feb. 8, 1916.
2 SHEETS—SHEET 1.
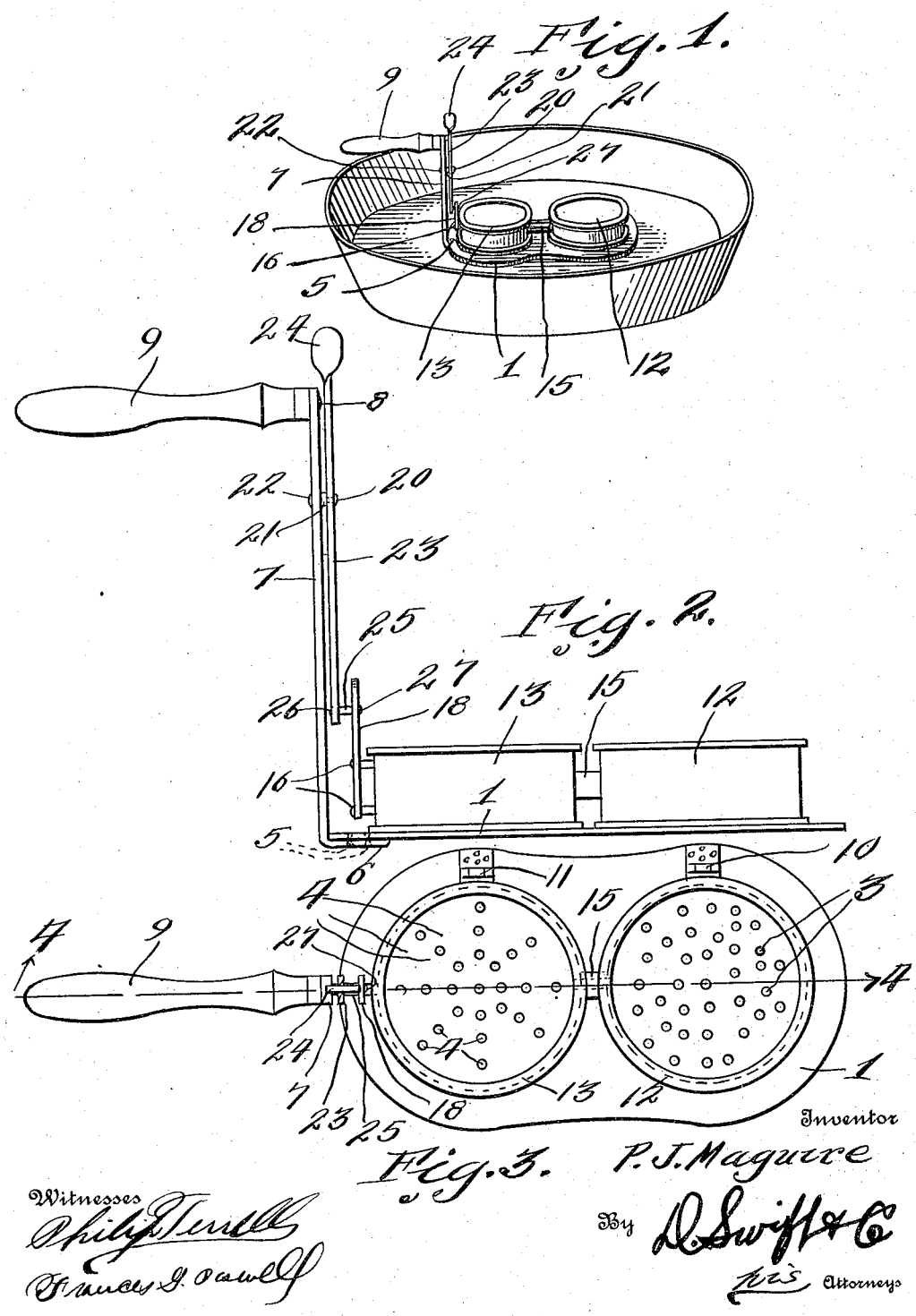

P. J. MAGUIRE.
EGG POACHER.
APPLICATION FILED APR. 30, 1915.
1,170,922.
Patented Feb. 8, 1916.
2 SHEETS—SHEET 2.
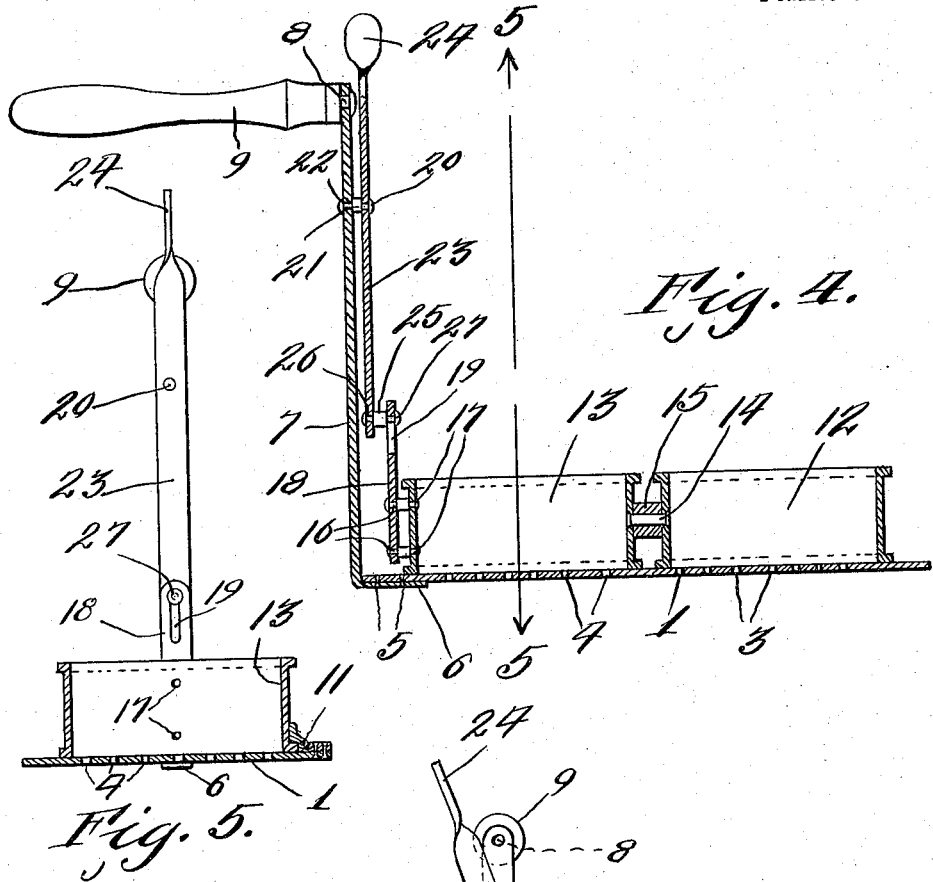
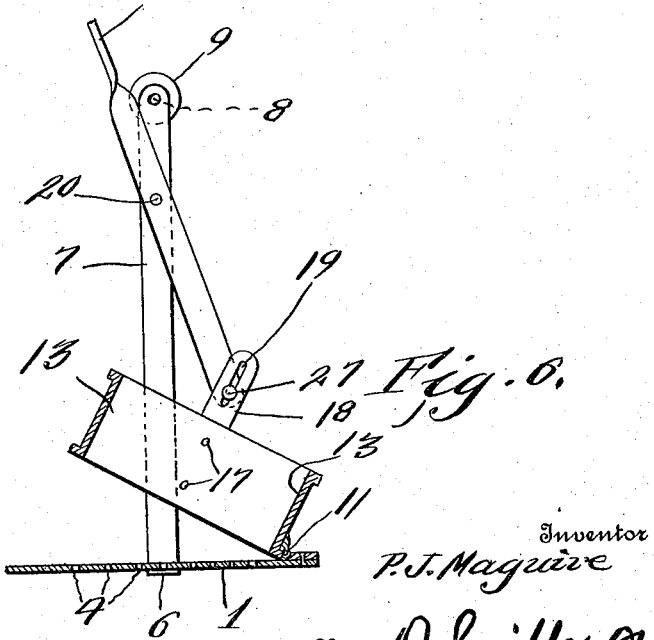
Witnesses
Inventor
P. J. Maguire
By D. Swift & Co.
his Attorneys

UNITED STATES PATENT OFFICE.

PETER J. MAGUIRE, OF HUTCHINSON, KANSAS.

EGG-POACHER.

1,170,922.  Specification of Letters Patent.  Patented Feb. 8, 1916.

Application filed April 30, 1915. Serial No. 24,999.

*To all whom it may concern:*

Be it known that I, PETER J. MAGUIRE, a citizen of the United States, residing at Hutchinson, in the county of Reno and State of Kansas, have invented a new and useful Egg-Poacher; and I do hereby declare the following to be a full, clear, and exact description of the invention, such as will enable others skilled in the art to which it appertains to make and use the same.

This invention relates to the art of domestic cooking utensils, and particularly to an improved egg poacher, and an object of the invention is to provide a device of this nature having a perforated base and handle therefor and multiple rims hinged to the base, to surround two series of perforations for holding the eggs.

Another object of the invention is to provide means on the supporting handle and having connections with the hinged rims, for tilting them so that the eggs after poached may be easily and quickly deposited in a suitable receptacle.

In practical fields the details of construction may necessitate alterations, falling within the scope of what is claimed.

In the drawings: Figure 1 is a view in perspective showing the improved egg poacher in use. Fig. 2 is a view in side elevation. Fig. 3 is a top plan view. Fig. 4 is a sectional view on line 4—4 of Fig. 3. Fig. 5 is a sectional view on line 5—5 of Fig. 4, showing parts in elevation. Fig. 6 is a sectional view similar to Fig. 5, showing one of the rims tilted, in order that the poached egg may be easily removed.

Referring more especially to the drawings, 1 designates the base, constructed of sheet metal. This base is provided with two series of perforations 3 and 4, arranged circularly. Riveted to the base as at 5 is the lower right angled end 6 of an upwardly extending strip 7, to which, as shown at 8, a handle 9 is riveted. The handle 9 and the strip 7 constitute means whereby the poacher may be supported in one hand. Hinged at 10 and 11 are two rims 12 and 13, which are annular, and riveted together as at 14, the rivet passing through a sleeve 15, which is interposed between the two rims, thereby causing the rims when tilted, to move together. The rims 12 and 13 respectively encircle the two series of apertures 3 and 4, in order to prevent the eggs from running off the base. Riveted at 16 and 17 by the double rivets to the rim 13 is an upwardly extending arm 18 having an elongated slot 19. Pivoted at 20 on a stud 21 (which is riveted at 22 to the strip 7) is a lever 23 having a thumb piece 24 at its upper end and a lug 25 riveted at 26 at its lower end. The lug 25 is provided with a headed end 27 extending through the slot 19 of the arm 18. In poaching eggs, they are deposited on the base two at a time, and within the rims. The handle 9 is then grasped, and the base with the eggs thereon and the rims surrounding them are lowered into a pan of boiling water. After the eggs are cooked sufficiently the poacher is removed, and by imparting a tilting movement to the lever 23, the rims may be tilted upwardly synchronously, and by tilting the entire device, the eggs will easily slide from the base into any suitable receptacle or dish.

The invention having been set forth, what is claimed as new and useful is:—

1. An egg poacher, comprising a base having a set of apertures, a supporting handle having a lower angled end secured to the base, whereby the handle rises vertically from the base, a rim hinged adjacent one side of the base and resting upon the upper surface of the base, said rim at right angles to its hinged connection having an upwardly extending arm provided with a slot in its upper portion, a lever pivoted to the supporting handle and being alined with said arm when the entire lower edge of the rim engages the base, the upper end of said lever having a thumb piece, and provided at its lower end with a headed pin engaging through said slot of the arm, so that when the lever at its lower end is tilted toward the hinge of the rim, the rim is tilted upwardly to permit the removal of the eggs.

2. An egg poacher, comprising a base having two sets of apertures and provided with a supporting handle, a pair of rims pivoted to the base and respectively encircling each set of apertures, said rims being connected so as to move as one body, an upwardly extending arm carried by one rim and provided with a slot in its upper portion, a lever pivoted to the supporting handle and having a thumb piece at its upper end, and a headed pin at its lower end engaging said slot, so that as the lever is tilted to one side the rims may be tilted upwardly synchronously to permit the removal of the eggs.

In testimony whereof I have signed my name to this specification in the presence of two subscribing witnesses.

PETER J. MAGUIRE.

Witnesses:
GEO. A. NEELEY,
RALPH W. STEET.

Copies of this patent may be obtained for five cents each, by addressing the "Commissioner of Patents. Washington, D. C."